United States Patent [19]

Sasaki et al.

[11] Patent Number: 4,835,635
[45] Date of Patent: May 30, 1989

[54] COMPACT ROTARY MAGNETIC DISC DEVICE HAVING A MAGNETIC DISC HOLDER

[75] Inventors: Hidemi Sasaki; Kiyotaka Kaneko, both of Tokyo; Naoki Kobayashi, Omiya, all of Japan

[73] Assignee: Fuji Photo Film Co., Ltd., Kanagawa, Japan

[21] Appl. No.: 117,860

[22] Filed: Nov. 6, 1987

[30] Foreign Application Priority Data

Dec. 11, 1986 [JP] Japan .................................. 61-295556
Jan. 23, 1987 [JP] Japan .................................. 62-14916

[51] Int. Cl.$^4$ ...................... G11B 5/008; G11B 15/00; G11B 17/00
[52] U.S. Cl. .................. 360/96.5; 360/99.05
[58] Field of Search ..................... 360/97–99, 360/96.5, 96.6, 86, 133, 105, 106

[56] References Cited

U.S. PATENT DOCUMENTS 4,620,249 10/1986 Suzaki et al. ..................... 360/97
4,694,364 9/1987 Matsuda et al. .................. 360/97

FOREIGN PATENT DOCUMENTS 0026837 4/1981 European Pat. Off. ............. 360/99
0038754 2/1985 Japan ................................... 360/97
0038756 2/1985 Japan ................................. 360/96.6

Primary Examiner—Robert S. Tupper
Assistant Examiner—David J. Severin
Attorney, Agent, or Firm—Sughrue, Mion, Zinn, Macpeak, and Seas

[57] ABSTRACT

A rotary magnetic disc device suitable for use in a magnetic recording/reproducing apparatus in an electronic still camera or the like. In the rotary magnetic disc device, a cover lock mechanism, a regulation plate drive mechanism and a center core push drive mechanism can be operated by use of a movable plate the movement of which can be controlled by a cam and, therefore, an operation to remove the locking of a cover, an operation to retreat a regulation plate and an operation to remove the pushing against a center core can be performed by a single drive source, so that a compact rotary magnetic disc device can be obtained.

13 Claims, 15 Drawing Sheets

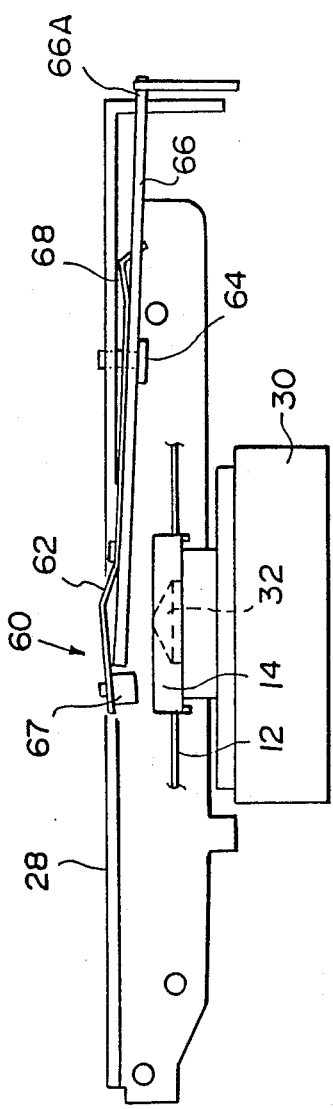
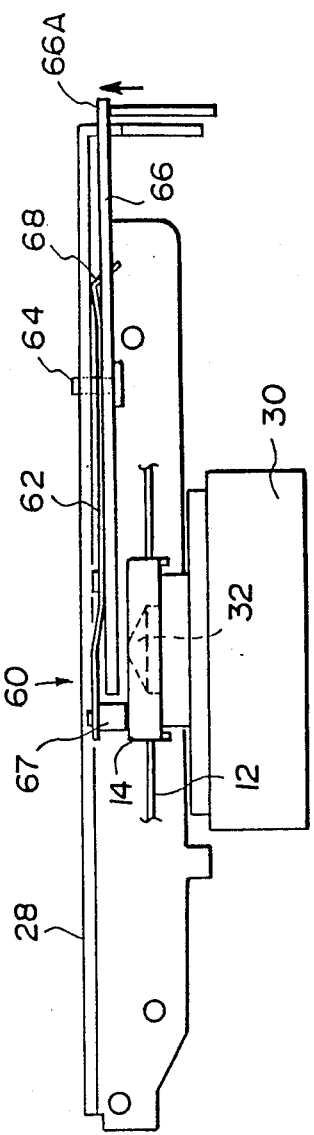

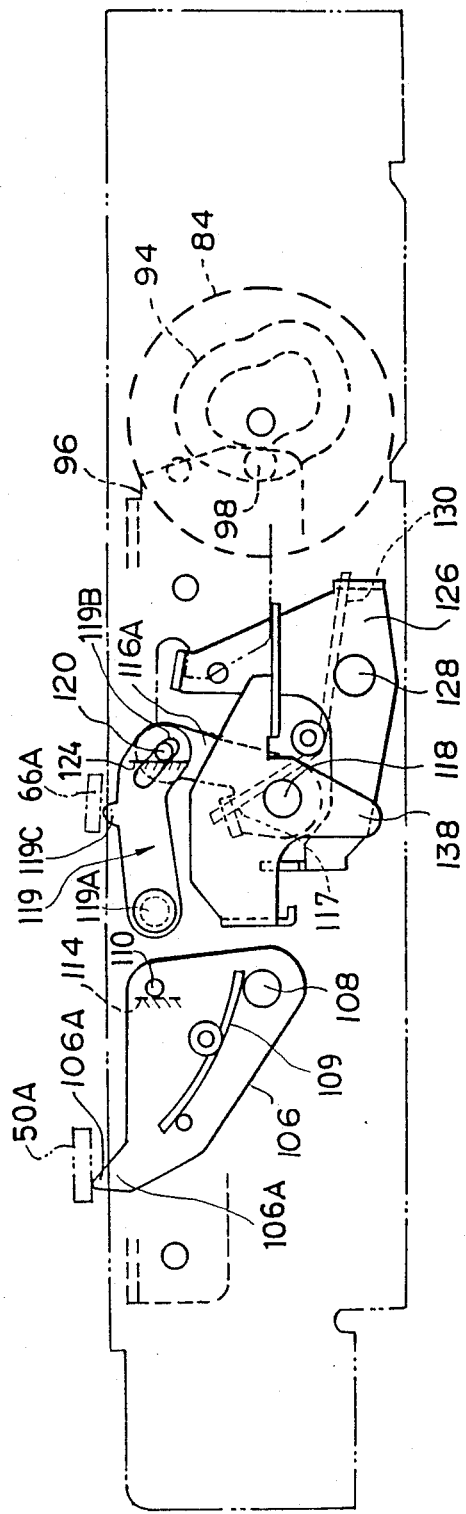

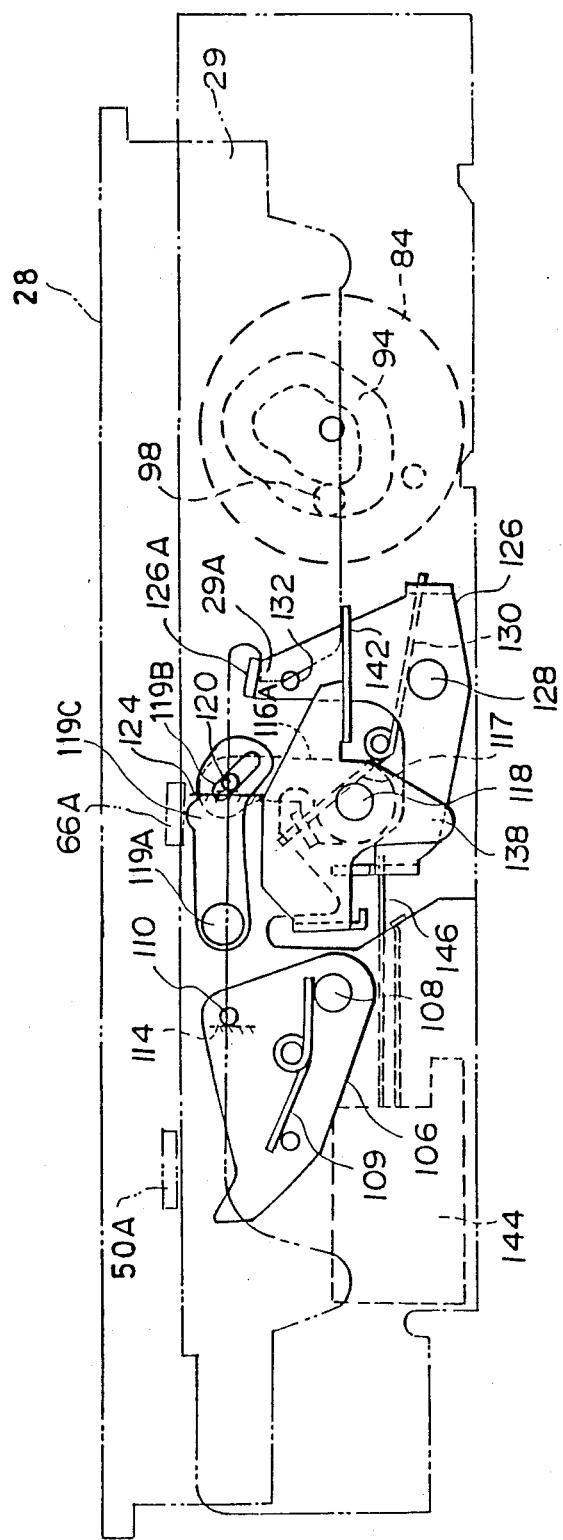

COMPACT ROTARY MAGNETIC DISC DEVICE HAVING A MAGNETIC DISC HOLDER

BACKGROUND OF THE INVENTION

1. Field of the Invention

The present invention relates to a rotary magnetic disc device and, in particular, to a rotary magnetic disc device which is suitable for use in a magnetic recording-/reproducing apparatus in an electronic still camera or the like.

2. Description of the Related Art

Recently, there has been developed an attractive electronic still camera system in which an image pickup device such as a solid image pickup element, an image pickup tube or the like is combined with a recording device employing as a recording medium thereof an inexpensive magnetic disc having a relatively larger storage capacity such that an object can be still photographed electronically and recorded into a rotating magnetic disc and the reproduction of the recorded image can be performed by means of a television system, a printer or the like which is provided separately from the electronic still camera system.

The magnetic disc that is employed in such camera system is usually used in the form of a magnetic disc pack. In the magnetic disc pack there is rotatably stored a magnetic disc which is capable of magnetic recording of still image information or the like, and such magnetic disc pack is used after it is mounted to a rotary magnetic disc device which is incorporated in an electronic camera.

When the magnetic disc pack is mounted to the magnetic recording or reproducing apparatus in the electronic camera, it is troublesome and inconvenient to directly mount or locate a central bore, which is formed in a center core disposed in the central portion of the magnetic disc within the magnetic disc pack, onto a rotary drive shaft which is positioned on the side of the magnetic recording or reproducing apparatus. For this reason, such locating operation may result in the inaccurate mounting of the magnetic disc pack to the magnetic recording or reproducing apparatus.

In order to eliminate the above-mentioned problem, conventionally, there has been proposed a magnetic disc pack loading/unloading device which comprises a cover supported to the main body of the magnetic recording or reproducing apparatus such that it can be freely opened or closed, and a pack holder which can be operated cooperatively with the cover and in which the magnetic disc pack can be stored. That is, in the magnetic disc pack loading/unloading device, by closing the cover after insertion of the magnetic disc pack into the pack holder, a magnetic disc in the magnetic disc pack within the pack holder can be mounted to the rotary drive shaft of the main body of the magnetic recording or reproducing apparatus.

By the way, in the above-mentioned magnetic disc pack loading/unloading device, there is a necessary center core push member which is used to securely mount the center core of the magnetic disc to the rotary drive shaft. The center core push member is adapted such that, when closing the cover, it pushes against the center core of the magnetic disc from above toward the drive shaft and, during the magnetic recording or reproducing operation, it gets detached from the center core of the magnetic disc.

Also, in such magnetic disc pack loading/unloading device, there must be provided a regulation plate which is disposed at a position opposing to a magnetic head and is used to run the magnetic disc along the magnetic head during the magnetic recording or reproducing operation. The regulation plate is located at a position opposed to the magnetic head with the magnetic disc therebetween during the magnetic recording or reproducing operation However, in operations other operations than the magnetic recording or reproducing operation, the regulation plate must be separated from the magnetic head so as to prevent production of any pressure traces on the magnetic disc.

As mentioned above, in the rotary magnetic disc device in accordance with the prior art, there are necessarily a cover lock mechanism, a center core push drive mechanism, a regution plate drive mechanism and the like which need drive sources, respectively. The provision of the respective drive source requires a large space therefor.

SUMMARY OF THE INVENTION

The present invention aims at eliminating the drawbacks found in the above-mentioned prior art rotary magnetic disc device.

Accordingly, it is an object of the present invention to provide a compact rotary magnetic disc device in which a locked cover can be unlocked, the pushing of a center core can be removed and a regulation plate can be retreated by a single and common drive source.

In order to accomplish the above object, according to the present invention, there is provided a rotary magnetic disc device which comprises: a main body; a cover journaled to said device main body such that it can be freely opened or closed; a pack holder operable cooperatively with said cover, journaled to said device main body such that it can be freely opened or closed, and formed in such a shape as to be able to store a magnetic disc pack therein; a first rotary drive source disposed in said device main body and adapted such that, while said cover is closed, a rotary drive shaft thereof can be fitted into a center core provided in a magnetic disc to rotate said magnetic disc; a cover lock mechanism which is used to secure said cover while said cover is closed; a regulation plate drive mechanism adapted to allow a regulation plate to be advanced or retreated with respect to a mgnetic head while said cover is closed; a center core push member disposed internally of said cover in a freely rotatable manner and adapted such that, while said cover is closed, if said push member is inclined in a predetermined amount, it can push against said center core by means of the center core push portion thereof; a center core push drive mechanism adapted to incline said center core push member; a second rotary drive source disposed in said device main body; a cam connected with and driven by said second rotary drive source; and, a movable plate provided with a follower the movement of which can be controlled by said cam and also adapted to operate said cover lock mechanism, regulation plate drive mechanism and center core push drive mechanism.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 7 and 8 are respectively side views of a center core push mechanism employed in the invention;

DETAILED DESCRIPTION OF THE INVENTION

Detailed description will hereunder be given of the preferred embodiments of a rotary magnetic disc device according to the present invention with reference to the accompanying drawings.

Figure 1:
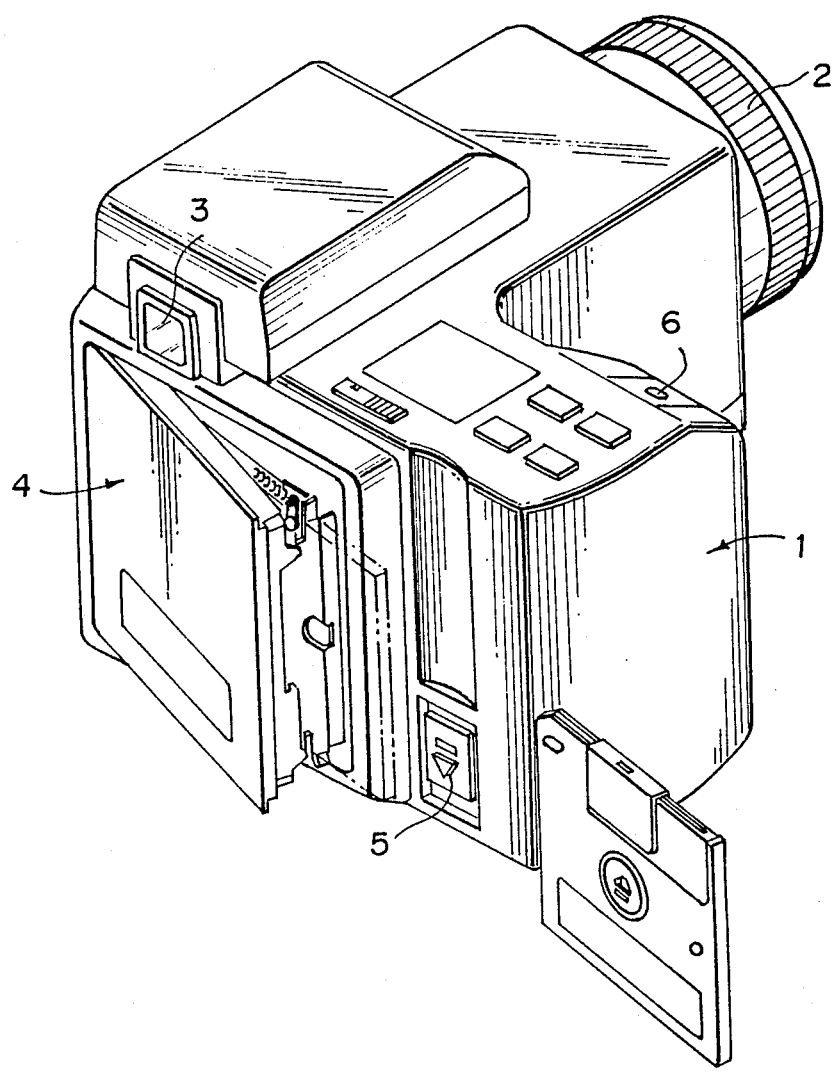
FIG. 1 is a perspective view showing the structure of the appearance of an electronic still camera to which the present invention is applied.

Referring first to FIG. 1, there is illustrated a general structure of an electronic still camera to which a rotary magnetic disc device of the invention is applied. In this figure, reference numeral 1 designates a camera body, 2 a photographing lens mount, 3 a finder, 4 a rotary magnetic disc device, 5 a knob for opening a cover of the rotary magnetic disc device, and 6 a shutter release button of the electronic still camera.

Next, the structure of a magnetic disc pack to be mounted onto the rotary magnetic disc device 4 will be described in connection with FIGS. 2 and 3.

Figure 2:
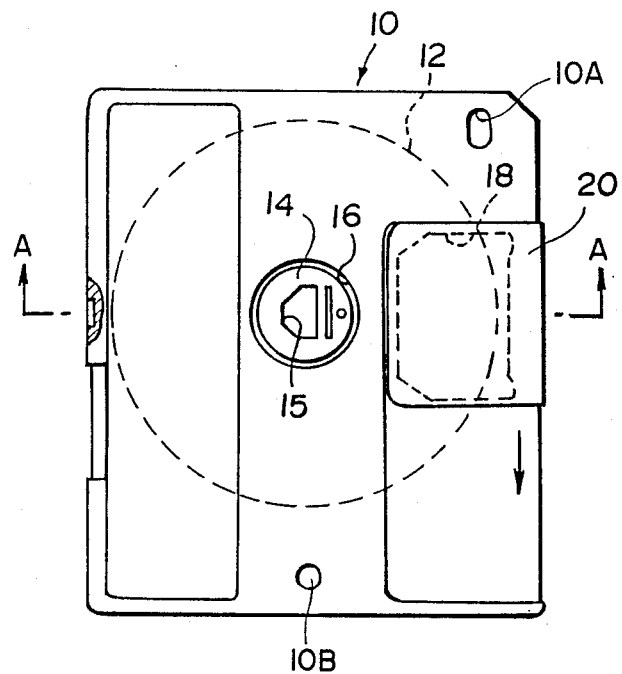
FIG. 2 is a plan view of magnetic disc pack used in the electronic still camera shown in FIG. 1.
Figure 3:
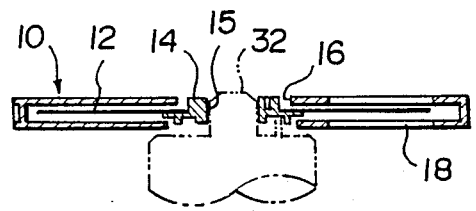
FIG. 3 is a section view of the above magnetic disc pack, taken along A—A line in FIG. 2.

In FIG. 2, there is shown a plane view of the magnetic disc pack and, in FIG. 3, there is shown a section view of the magnetic disc pack taken along a line A—A in FIG. 2. As shown in FIG. 2, the magnetic disc pack 10 is formed in a substantially square shape and, within the square-shaped disc pack 10, there is stored a magnetic disc 12 in a freely rotatable manner into which still image information or the like can be recorded. In the central part of the magnetic disc 12 there is provided a center core 14 which serves as a reinforcing member of the magnetic disc 12. The center core 14 is exposed externally from a circular opening formed in the magnetic disc pack 10. In the magnetic disc pack 10 there is formed a window portion 18 in which a magnetic head is to be positioned, and the window portion 18 for a magnetic head can be opened or closed by means of a slidable shutter 20. That is, before the magnetic disc pack 10 is inserted into a pack holder 26, the shutter 20 closes the window portion 18 to prevent the magnetic disc 12 from being attached by dust. After the pack 10 is inserted into the pack holder 26, the shutter 20 moves in a downward direction in FIG. 2 to open the magnetic head window portion 18, thereby permitting recording into or reproducing from the magnetic disc 12.

Figure 4:
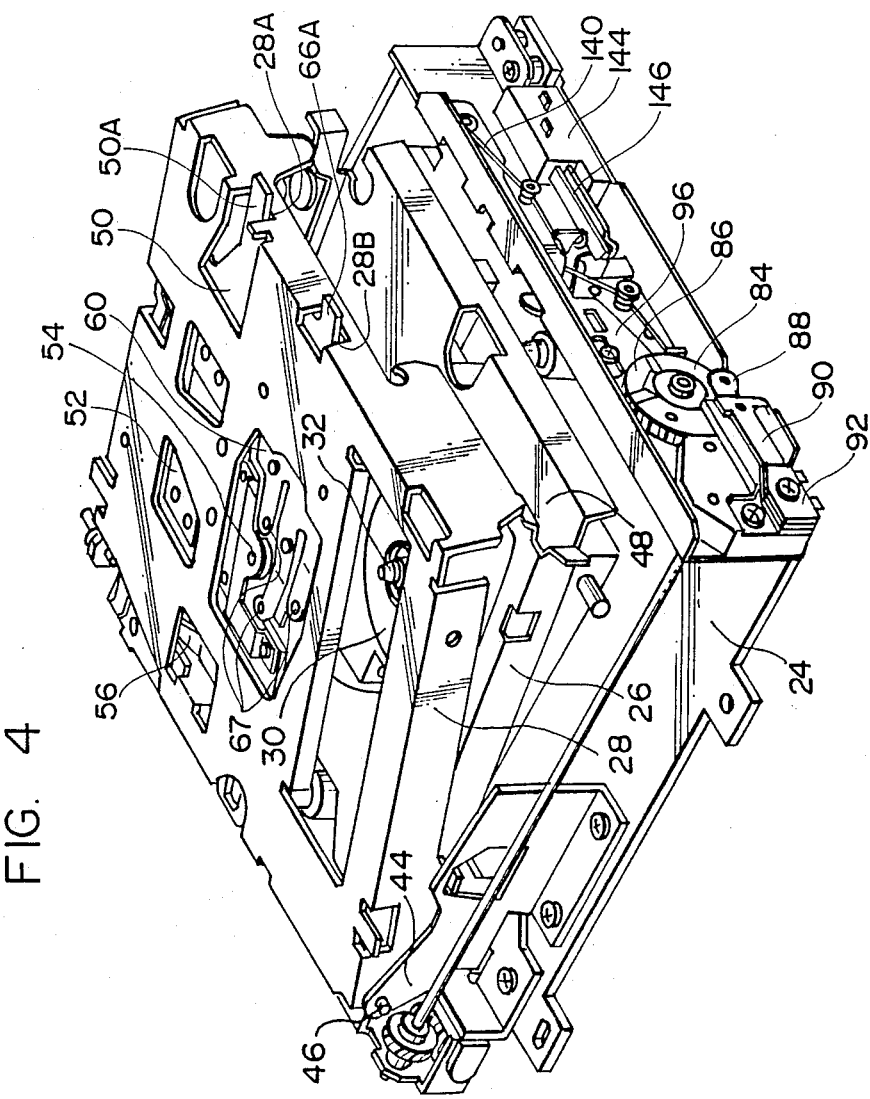
FIG. 4 is a perespective view showing the state of the rotary magnetic disc device used in the electronic still camera shown in FIG. 1, in which the cover of the rotary magnetic disc device is opened.
Figure 5:
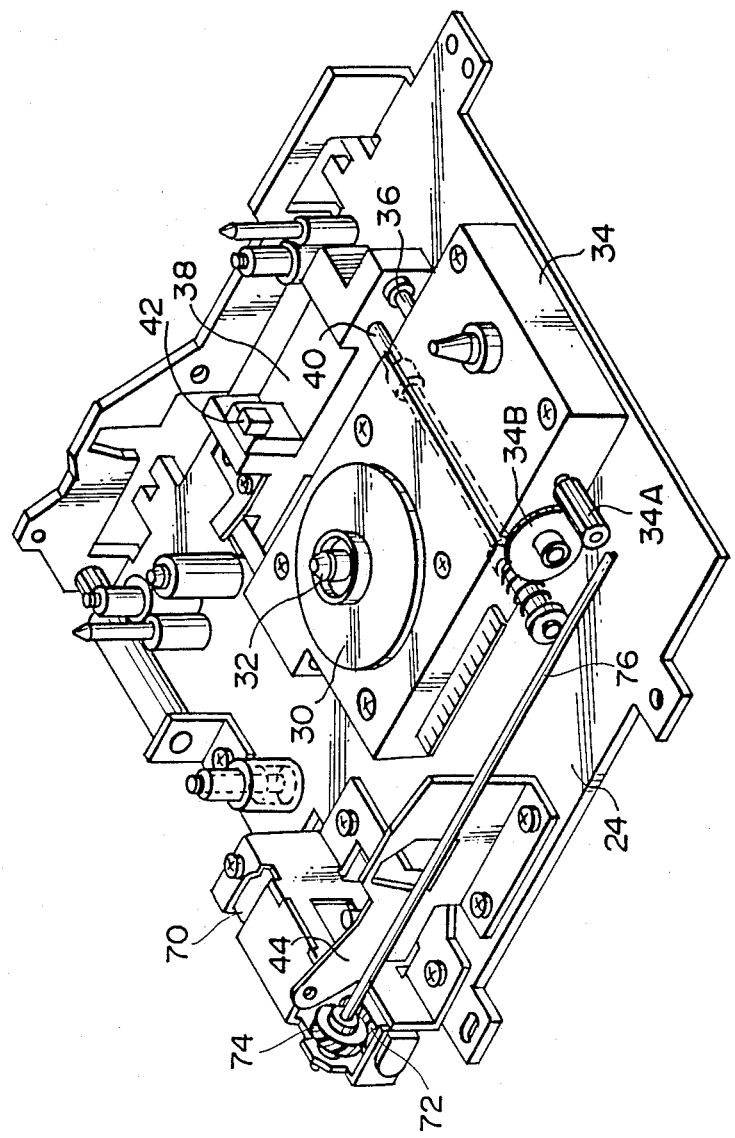
FIG. 5 is a perspective view showing the internal structure of the rotary magnetic disc device.
Figure 6:
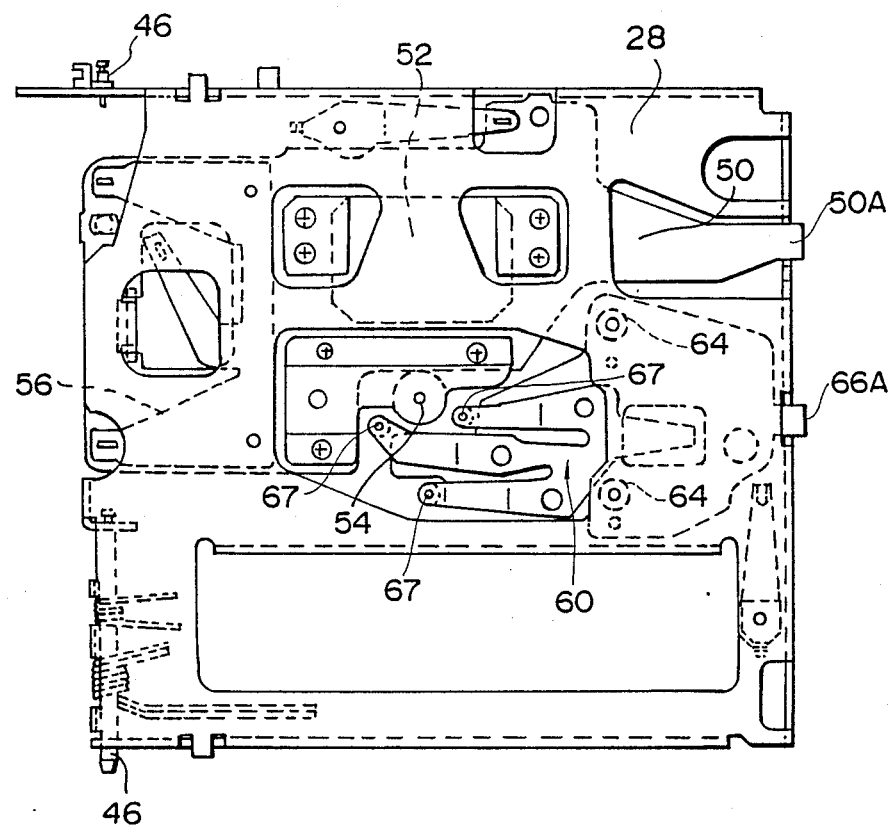
FIG. 6 is a plan view of a pack holder employed in the above embodiment of the invention.

Referring now to FIGS. 4 to 6, there is shown the internal structure of an embodiment of a rotary magnetic disc device according to the invention. In this embodiment, the rotary magnetic disc device comprises a main body 24, a pack holder 26 and a cover 28. Referring first to the structure of the device main body 24, within the device main body 24 there is provided a motor 30 for driving a magnetic disc which is provided with a drive shaft 32. The drive shaft 32 can be inserted into a central bore 15 formed in a center core 14 disposed in a magnetic disc pack 10 shown in FIG. 3 so as to rotate the magnetic disc 12 at a given number of rotations within the magnetic disc pack 10. Also, in FIG. 5, reference numeral 34 designates a motor which is used to feed a magnetic head, 36 a lead screw connected via gears 34A, 34B to the output shaft of the motor 34, 38 a head carriage threadedly engageable with the lead screw 36 and also adapted such that it can be guided and moved by a guide shaft 40, and 42 a magnetic head provided on the head carriage 38. Accordingly, if the motor 34 is rotated at every given number of rotations, then the head carriage 38 can be moved at every given pitch in the axial direction of the guide shaft 40 by means of rotation of the lead screw 36, so that the magnetic head 42 is moved in the radial direction of the magnetic disc 12 so as to be able to record or reproduce still image information on the magnetic disc 12, that is, at each of tracks provided on the magnetic disc 12.

Also, on the two ends of the device main body 24, there are provided two brackets 44, 44 (in FIG. 4, only one of them is shown), respectively, to which brackets 44, 44 the pack holder 26 and the cover 28 are pivotally supported via a pin 46. The cover 28 is energized in a direction to open with respect to the device main body 24 by a spring which is not shown, and also between the cover 28 and the pack holder 26 there is interposed another spring which is energizing the pack holder 26 in a direction away from the cover. Therefore, as shown in FIG. 4, in a state where the cover 28 is open, the pack holder 26 stands away from both the device main body 24 and the cover 28 to open a magnetic disc pack insertion opening 48 formed in the pack holder 26.

As shown in FIG. 4, the cover 28 is provided with a regulation plate holder 50 such that it can be moved a very slight distance in a vertical direction. The regulation plate holder 50 is equipped with a regulation plate 52, a P.G sensor 54 and the like. The regulation plate holder 50 is energized by a plate spring 56 in a downward direction, that is, toward the magnetic head. Also, as shown in FIGS. 4 and 5, an end portion 50A provided in the front portion of the regulation plate holder 50 is projected out from an opening 28A formed in the front edge of the cover 28.

Also, the cover 28 is further provided with a center core push member 60 in such a manner that it can be moved a very slight distance. The center core push member 60, as shown in FIG. 7, is composed of a plate spring 62 and a lever 66 connected via a pin 64 to the plate spring 62. The pin 64 is staked to the cover in such a manner that it is loosely fitted through the plate spring 62 and the lever 66. There is formed a slight clearance between the rear surface of the cover 28 and the plate spring 62, lever 66. In the front end portion of the plate spring 62 there are formed three center core push portions 67, 67, 67 and the the plate spring 62 is further provided with a substantially dogleg-shaped portion 68 in the rear end thereof. Therefore, in a state in which an upwardly pushing force is not acted on the lever 66, as shown in FIG. 7, due to the energizing force of the dogleg-shaped portion 68 of the spring 62, a force to energize in a clockwise direction with the pin 64 being a fulcrum is applied onto the lever 66, so that the center core push portions 67 in the front end portion of the plate spring 62 are being separated from the center core 14 of the magnetic disc 12. As shown in FIG. 8, if an external force is exerted onto the lever 66 against the dogleg-shaped portion 68 of the plate spring 62, then the lever 66 is caused to rotate counterclockwise about the pin 64 and the plate spring 62 provided in the lever is also rotated similarly, so that, as shown in FIG. 8, the center core push portions 67 of the plate spring are brought into contact with the center core 14 to push against the center core 14 toward the drive shaft 32. The lever 66 also includes an end portion 66A which is projected externally out of another opening 28B formed in the cover 28.

Figure 9:
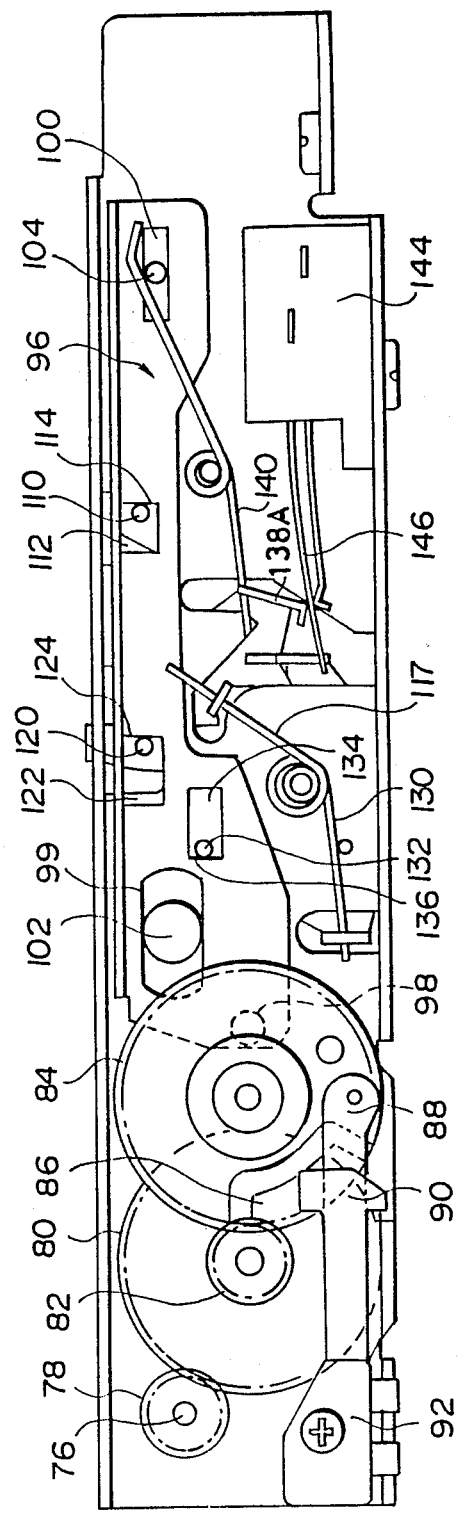
FIG. 9 is a front view of the main portions of an embodiment of a rotary magnetic disc device according to the present invention.

As shown in FIG. 5, in the depth-side end portion of the device main body 24, there is arranged a second drive source 70 which is provided with an output shaft. The output shaft of the second drive source 70 is provided with a worm 72 which meshes with a worm gear 74. The worm gear 74 is connected with a drive shaft 76 and the drive shaft 76 is in turn connected with a gear 78 which is shown in FIG. 9. The gear 78 meshes with a gear 80 and a gear 82, coaxial with the gear 80, engages with a cam gear 84. The cam gear 84 is shaped in the form of a double cam. In one of the two surfaces (that is, the front surface) of the cam gear 84 there is formed a recessed portion 86. When a switch piece 88 is situated in this recessed portion 86, its contact with a switch piece 90 is removed, with the result that a switch 92 is turned off. The switch 92 is used to detect the rotational reference position of the cam gear 84.

The other surface (that is, the rear surface) of the cam gear 84 is shown in FIGS. 10 through 13. FIGS. 10 through 13 are respective views obtained by observing the relevent portion of the present device from behind FIG. 9 and, therefore, in FIGS. 9 and 10 the same parts are reversed in the right and left positions thereof with respect to each other. The cam gear 84 is provided with a groove cam 94 and a follower 98 planted on a slide plate 96 is fitted into the groove cam 94. In the slide plate 96, as shown in FIG. 9, there are formed large and small elongated bores 99, 100. Pins 102, 104 planted from the device main body 24 are positioned in the large and small elongated bores 99, 100, respectively, so that the slide plate 96 can be guided by guide pins 102, 104 to move a given distance in the right and left direction in FIG. 9. Therefore, when the cam gear 84 is rotated, then the slide plate 96 is moved in the right and left direction in FIG. 9.

Figure 10:
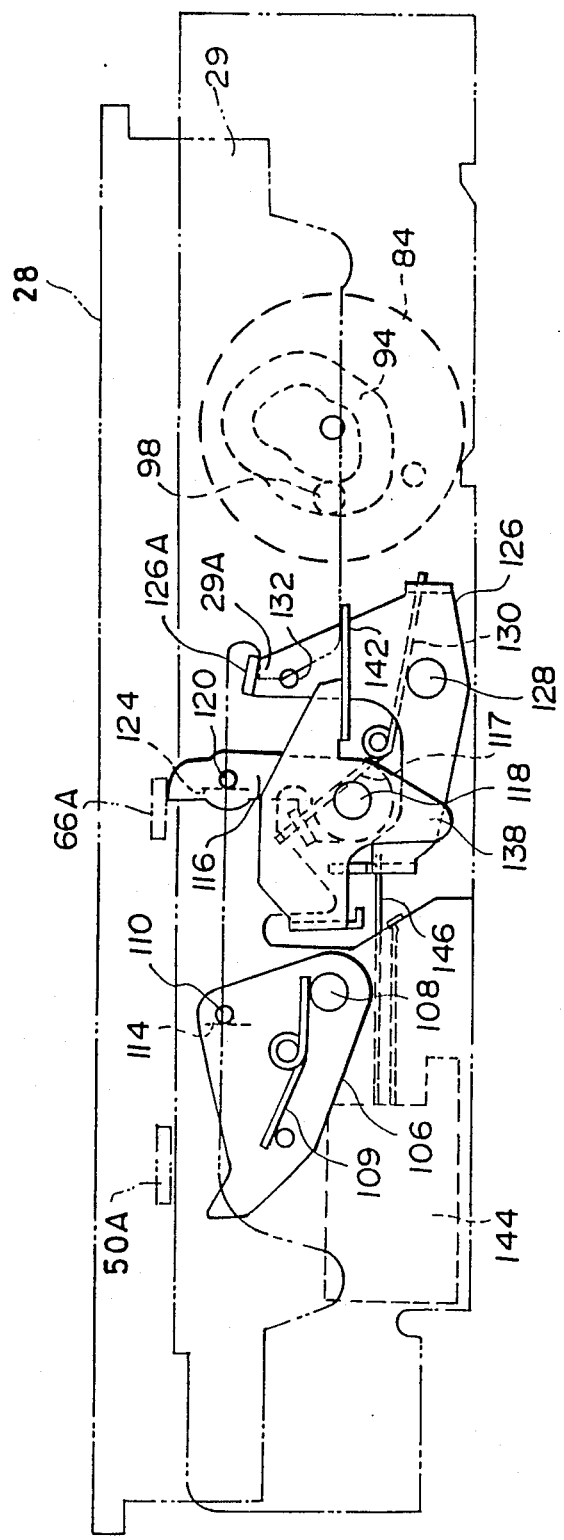
FIGS. 10 through 13 are respectively rear views of the embodiment in FIG. 9, illustrating the respective operation states of a slide plate employed in the same embodiment.

As shown in FIG. 10, the device main body 24 is provided with a regulation plate drive lever 106. The regulation plate drive lever 106 is rotatably supported by a pin 108 and is also energized by a spring 109 in a counterclockwise direction in FIG. 10. Also, the regulation plate drive lever 106 is provided with a pin 110 which is situated in an opening 112 (which is shown in FIG. 9) formed in the slide plate 96. Therefore, if the slide plate 96 is moved in the left direction in FIG. 9 by means of action of the cam gear 84, the pin 110 is pushed by the side edge 114 of the opening 112 and is then rotated against the energizing force of the spring. As a result of this, the end member 50A of the regulation plate holder 50 is pushed up by the lever 106, so that the regulation plate is moved into its retreat position from its set position.

Also, in the device main body 24, there is supported a center core push member drive lever 116 in such a manner that it can be freely rotated about a pin 118. This drive lever 116 is also rotatively energized in a counterclockwise direction in FIG. 10 by a spring 117.

Further, in the drive lever 116 there is planted a pin 120 which is positioned within an opening 122 (which is shown in FIG. 9) formed in the slide plate 96. For this reason, if the slide plate 122 is moved in the left direction in FIG. 9, then the pin 120 is pushed by the side edge 124 of the opening 122, so that in FIG. 10 the drive lever 116 is rotated clockwise against the energizing force of the spring 117. The center core push member drive lever 116 has an upper end portion which, as shown in FIG. 10, is in contact with the end portion 66A of the lever 66 of the center core push member 60. Therefore, when the center core push member drive lever 116 is rotated clockwise about the pin 118 in FIG. 10 due to the movement of the slide plate 96, then the contact of the upper end portion thereof with the lever end portion is removed so that the lever 66 is moved downward and the center core push portion 67 is separated from the center core 14 of the magnetic disc 12, thereby providing the magnetic recording or reproduction enabling state.

Moreover, in the device main body 24 there is supported a cover lock lever 126 in such a manner that it can be freely rotated about a pin 128. The cover lock lever is also rotatively energized by a spring 130 in a counterclockwise direction in FIG. 10. The cover lock lever 126 is provided in the upper end portion thereof with a lock piece 126A which is formed by folding. The lock piece 126A is initially brought into contact with the front edge 29 of the cover 28 when the cover 28 is closed and, during such initial contact, the lock lever 126 is rotated slightly in a counterclockwise direction. And, when the projection piece 29A of the front edge 29 is located below the lock piece 126A, the lock lever 126 is rotated clockwise in FIG. 10 due to the energizing force of the spring 130 so that, as shown in FIG. 10, it is able to lock the front edge 29 of the cover 28. In the lock lever 126 there is planted a pin 132 which is positioned within a rectangular opening 134 formed in the slide plate 96 as shown in FIG. 9. Therefore, if the slide plate 96 is moved in the right direction in FIG. 9, then the pin 132 is pushed by the side edge 136 of the opening 134 and is rotated counterclockwise against the energizing force of the spring 130 in FIG. 10 to remove the engagement between the lock piece 126A and the projection piece 29A, so that the locking of the cover 28 can be unlocked.

In addition, there is supported a switch operation lever 138 in such a manner that it can be freely rotated about 118 and the switch operation lever 138 is also rotatively energized counterclockwise in FIG. 10 by a spring 140 which is shown in FIG. 9. When the cover 28 is closed to bring the lower portion 29B of the front edge 29 into contact with a receive portion 142, then the switch operation lever 138 is removed off from a contact 146 provided in a switch 144, whereby the switch 144 is operated to detect that the cover 28 is closed, which permits preparation for the magnetic recording or reproducing state. That is, while the cover 28 is open, the switch operation lever 138 turns on the switch 144 as shown in FIG. 9, and when the cover 28 is completely closed, the end portion 138A of the switch operation lever 138 is disconnected from the contact 146 of the switch 144 to turn off the switch 144 as shown in FIG. 10, which is a starting point of an operation to provide the next magnetic recording or reproducing state.

Now, we will describe below the operation of the above embodiment of the rotary magnetic disc device of the invention that is constructed in the above-mentioned manner. At first, in the state shown in FIG. 1 in which the present rotary magnetic disc device is open, the magnetic disc pack 10 is inserted into the pack holder 26. When the magnetic disc pack 10 is inserted within the pack holder 26, the magnetic disc pack 10 is guided and inserted into the two side end portions of the pack holder 26. After the magnetic disc pack 10 has been completely inserted into the pack holder 26, if the cover 28 is pushed down toward the device main body 24, then the center core 14 is mounted onto the drive shaft 32 and at the same time the switch operation lever 138 is rotated by the front edge 29 of the cover 28 to operate the switch 144. This state is shown in FIG. 10. The cover 28 is secured by the lock piece 126A of the lever 126 and at the same time the lever 116 pushes up the end portion 66A of the lever 66 to thereby perform the center core push operation.

Next, the second drive source 70 is operated; that is, the rotational force of the second drive source 70 is transmitted through the worm 72, worm gear 74 and drive shaft 76 to the gear 78, and the rotational force of the gear 78 is then transmitted through the gears 80, 82 to the cam gear 84. When the cam gear 84 is thus rotated, then the slide plate 96 is moved in the right and left direction in FIG. 9 by the cam groove 94 formed in the cam gear 84.

Figure 11:
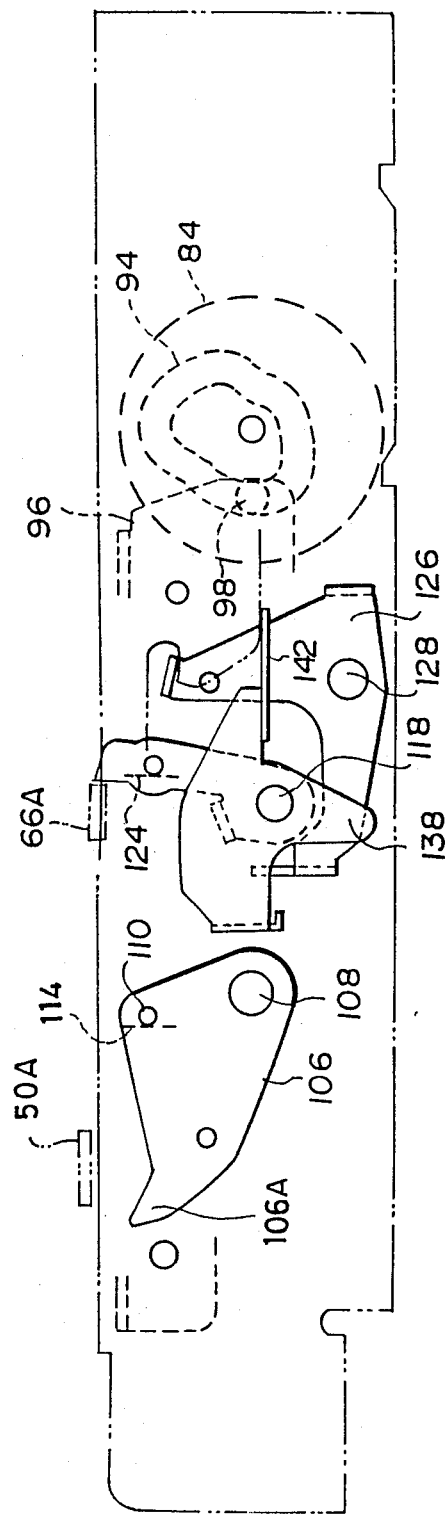

Specifically, if the slide plate 96 is moved in the left direction in FIG. 9 by means of the rotational movement of the cam gear 84, then the center core push member drive lever 116 is rotated from its position shown in FIG. 10 in a clockwise direction in FIG. 10, so that, as shown in FIG. 10, the engagement between the center core push member drive lever 116 and the end portion 66A of the lever 66 is removed to thereby move the lever 66 in a downward direction. This causes the center core push portion 67 to move apart from the center core 14, thereby completing the center core push operation. This state is shown in FIG. 11, in which the regulation plate 52 is set and thus the magnetic recording or reproducing operation is possible.

Figure 12:
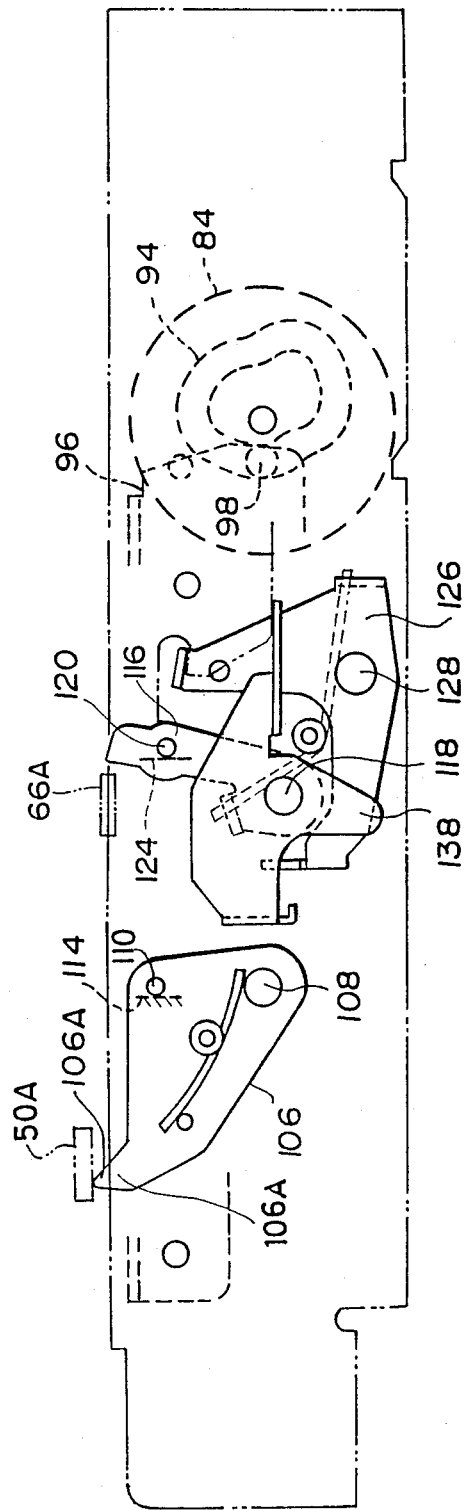

If the cam gear 84 is rotated further and thus the slide plate 96 is moved in the left direction in FIG. 9, then the regulation plate drive lever 106 is gradually rotated clockwise about the pin 108 against the energizing force of the spring 109 to cause the tip end portion 106A of the regulation plate drive lever 106 to move up the end portion 50A of the regulation plate holder 50, as shown in FIG. 12. As a result of this, while the cover 28 is open and the magnetic recording or reproducing state is not ready, the regulation plate 52 stands apart from the magnetic disc 12 to eliminate the possibility that the regulation plate 52 may produce any pressure traces on the magnetic disc 12.

Figure 13:
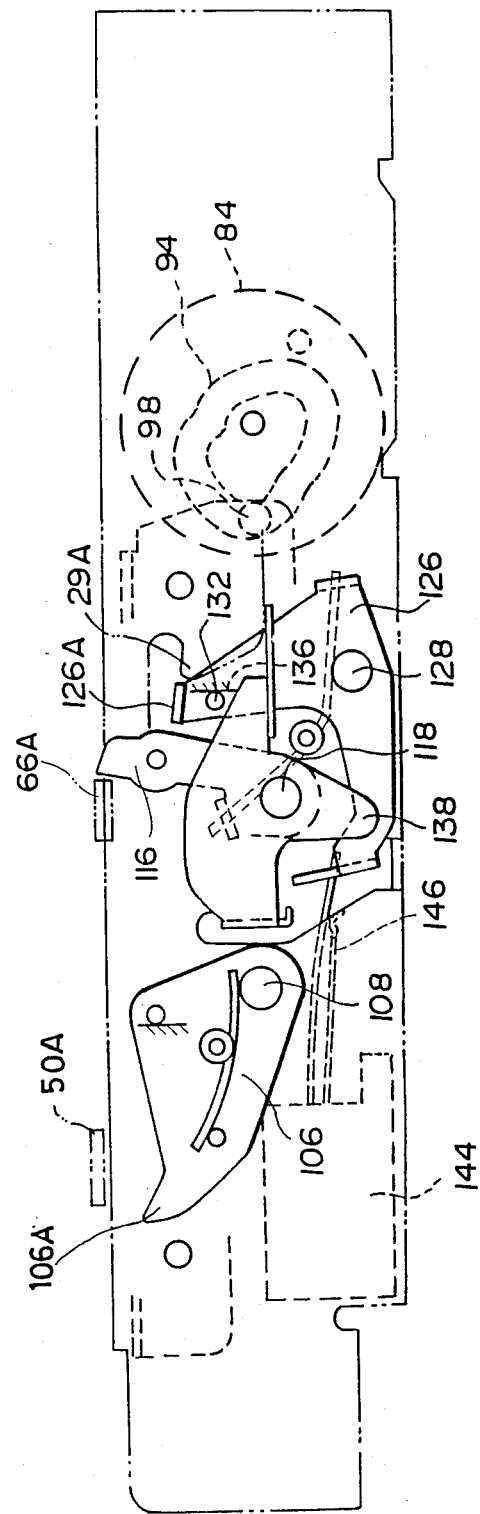

In order to open the cover 28 after the magnetic recording or reproducing operation is completed, the cam gear 84 is rotated to move the slide plate 96 in the right direction in FIG. 9. As a result of this, the lock lever 126 is rotated counterclockwise about the pin 128 as shown in FIG. 13 to remove the engagement between the lock piece 126A of the lock lever 126 and the projection piece 29A of the cover 28, so that the cover 28 can be opened by a spring which is not shown.

Next, description will be hereunder given of another embodiment of a rotary magnetic disc device according to the present invention in connection with FIGS. 14 through 17.

Figure 14:
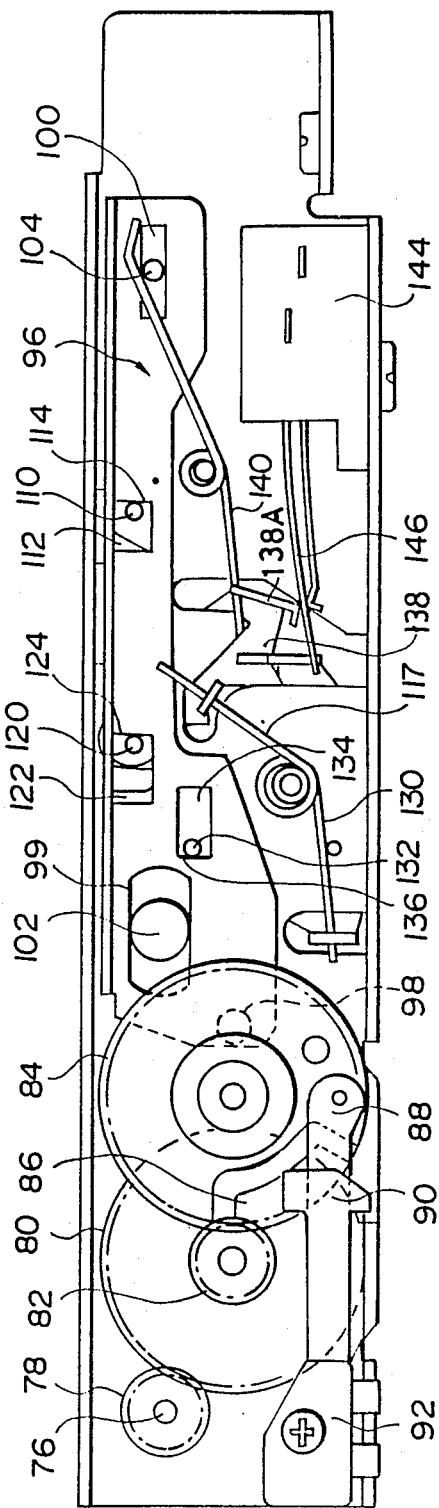
FIG. 14 is a front view of the main portions of another embodiment of a rotary magnetic disc device according to the inventiont and, FIGS. 15 through 17 are respectively rear views of the embodiment in FIG. 14, illustrating the respective operation states of a slide plate employed in the same embodiment.
Figure 15:
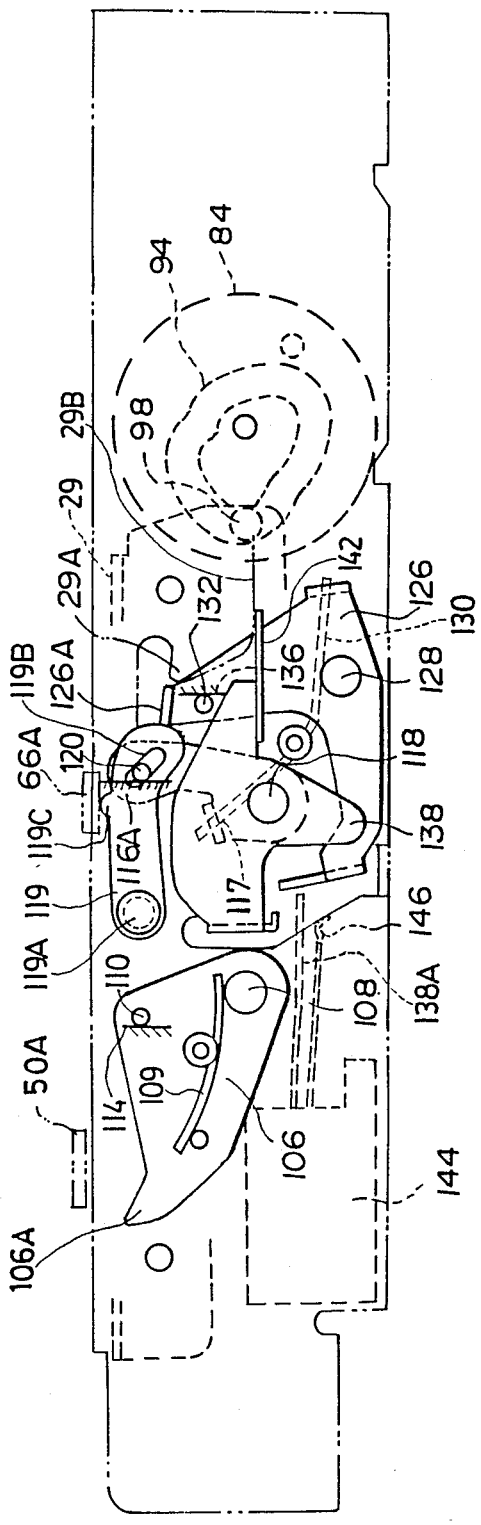

FIG. 14 is a front view of the main portions of the present rotary magnetic disc device and corresponds to FIG. 9 mentioned above. FIGS. 15 through 17 are views obtained by observing the same device from behind FIG. 14, respectively illustrating the operation states of the slide plate 96. This second embodiment is different from the above-mentioned first embodiment in that the center core push operation can be performed as many times as required independent of the closing operation of the cover 28. In other words, in place of the above-mentioned center core push member drive lever 116, there are provided a center core push member drive lever 116A and a center core push lever 119. Since other component parts in the second embodiment are the same as in the before-mentioned embodiment, they are given the same references and the detailed description thereof are omitted here.

The center core push member drive lever 116A is constructed substantially in the same shape with the above-mentioned center core push member drive lever 116 (see FIG. 10), however, the drive lever 116A is not provided with a projection portion to push against the end portion 66A of the lever 66 of the center core push member 60 as in the drive lever 116.

On the other hand, the center core push lever 119 is rotatably supported through the pin 119A by the device main body 24 and is provided with an oblique groove 119B which the pin 120 of the drive lever 116A is fitted. The projection portion 119C of the center core push lever 119 is, as shown in FIG. 10, in contact with the end portion 66A of the lever 66. Therefore, if the drive lever 116A is rotated clockwise about the pin 118 in FIG. 15 due to the movement of the slide plate 96, then the center core push lever 119 is rotated counterclockwise due to the action of the oblique groove 119B to push up the end portion 66A of the lever 66, with the result that the center core push portion 67 pushes against the center core 14 of the magnetic disc 12.

Now, we will describe the operation of the second embodiment of the rotary magnetic disc device according to the invention that is constructed in the above-mentioned manner.

At first, in the state shown in FIG. 1 in which the rotary magnetic disc device is open, the magnetic disc pack 10 is inserted into the pack holder 26. When inserted into the pack holder 26, the magnetic disc pack 10 is guided and inserted into the two side end portions of the pack holder 26. After the magnetic disc pack 10 has been completely inserted into the pack holder 26, if the cover 28 is pushed down toward the device main body 24, then the center core 14 is mounted to the drive shaft 32 and at the same time the switch operation lever 138 is rotated by the front edge 29 of the cover 28 so that the switch 144 is operated. This state is shown in FIG. 15. Next, the front edge 29 of the cover 28 is secured by the lock piece 126A.

Then, the second drive source 70 is operated: the rotational force of the second drive source 70 is transmitted via the worm 72, worm gear 74 and drive shaft 76 to the gear 78; and, the rotational force of the gear 78 is in turn transmitted via the gears 80, 82 to the cam gear 84. When the cam gear 84 is thus rotated, the slide plate 96 is moved in the right and left direction in FIG. 14 by the cam groove 94 in the cam gear 84.

At first, when the slide plate 96 is moved left in FIG. 14 by means of the rotational movement of the cam gear 84, then the drive lever 116A is rotated clockwise in FIG. 15 from its position shown in FIG. 15. By means of the rotational movement of the drive lever 116A, the center core push lever 119 is rotated counterclockwise about the pin 119A to push up the end portion 66A of the lever 66, with the result that the center core push portion 67 pushes against the center core 14 toward the drive shaft 32, that is, it performs the center core push operation. This state is shown in FIG. 16.

At the same time, when the slide plate 96 is moved left in FIG. 14, then the regulation plate drive lever 106 is also rotated clockwise gradually about the pin 108 against the energizing force of the spring 109 and, as a result of this, as shown in FIG. 16, the tip end portion 106A of the regulation plate drive lever 106 pushes up the end portion 50A of the regulation plate holder 50 to move the regulation plate 52 apart from the magnetic disc 12 so as to eliminate the possibility that the regulation plate 52 may leave any pressure traces on the magnetic disc 12.

Then, if the cam gear 84 is rotated in the reverse direction to move the slide plate 96 right in FIG. 14, then the drive lever 116A is rotated counterclockwise from its position shown in FIG. 16. As a result of this, the center core push lever 119 is rotated clockwise about the pin 119A to thereby move down the end portion 66A of the lever 66, so that the the center core push portion 67 is moved apart from the center core 14.

At the same time, when the slide plate 96 is moved right in FIG. 14, then the regulation plate drive lever 106 is rotated counterclockwise from its position shown in FIG. 16 to move down the end portion 50A of the regulation plate holder 50, with the result that the regulation plate 52 can be set at the magnetic recording/reproducing position. This state is shown in FIG. 17.

In order to open the cover 28 after the magnetic recording/reproducing operation is completed, the cam gear 84 is rotated to thereby move the slide plate 96 in the right direction in FIG. 14. As a result of this, the lock lever 126 is rotated, as shown in FIG. 15, counterclockwise about the pin 128 to remove the engagement between the lock piece 126A of the lock lever 126 and the projection piece 29A of the cover 28, so that the cover 28 can be opened by a spring which is not shown.

As has been described hereinbefore, according to the rotary magnetic disc device of the invention, the unlocking of the cover, the removal of the center core pushing operation and the retreat of the regulation plate can be performed by use of a single rotative drive source, so that the rotary magnetic disc device can be construced in a compact manner.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A rotary magnetic disc device comprising:
 a main body;
 a cover journaled to said device main body so as to be freely opened or closed;
 a pack holder operable in connection with said cover, and formed in such a shape as to be able to store a magnetic disc pack therein;
 a first rotary drive source disposed in said device main body and including a rotary drive shaft which, while said cover is closed, is adapted to be fitted into a center core in a magnetic disc to rotate said magnetic disc;
 a cover lock mechanism for securing said cover while said cover is closed and for releasing said secured cover;
 a regulation plate drive mechanism adapted to allow a regulation plate to advance or retreat with respect to a magnetic head while said cover is closed;
 a center core push member disposed rotatably within said cover and including a center core push portion in the tip end thereof which is adapted to push against said center core when said center core push member is inclined a given amount while said cover is closed;
 a center core push drive mechanism adapted to move said center core push member between an initial position and said inclined a given amount position;
 a second rotary drive source disposed in said device main body;
 a cam connected with and driven by said second rotary drive source; and,
 a movable plate including a follower, the movement of which is controlled by said cam, adapted to operate said cover lock mechanism, regulation plate drive mechanism and center core push mechanism.

2. A rotary magnetic disc device as set forth in claim 1, wherein said cover lock mechanism comprises a cover lock lever disposed rotatably in said device main body, including a lock piece in the upper end thereof and energized in a direction to lock said cover by means of said lock piece, and a projection piece disposed in the front edge of said cover and, when said cover is closed, enageable with said lock piece after said cover lock lever is rotated in a direction opposite to the energization direction of said cover lock lever.

3. A rotary magnetic disc device as set forth in claim 2, wherein said movable plate is adapted to remove the locking of said cover lock mechanism by rotating said cover lock lever in a direction opposite to the energization direction of said cover lock lever.

4. A rotary magnetic disc device as set forth in claim 1, wherein said regulation plate drive mechanism comprises a regulation plate holder having a lower surface on which a regulation plate is disposed, a spring adapted to energize said regulation plate holder in a direction to move said regulation plate holder apart from said cover, and a regulation plate drive lever disposed rotatably in said device main body and adapted, when located at a given rotational position, to push and retreat said regulation plate holder toward said cover against the energizing force of said spring.

5. A rotary magnetic disc device as set forth in claim 4, wherein said movable plate is adapted to retreat said regulation plate toward said cover by means of rotation of said regulation plate drive lever.

6. A rotary magnetic disc device as set forth in claim 1, wherein said center core push member comprises a first spring having a center core push portion in the tip end portion thereof, a lever provided with said first spring and disposed rotatably within said cover, and a second spring adapted to energize said lever in a direction to retreat said center core push portion of said first spring away from said rotary drive shaft.

7. A rotary magnetic disc device as set forth in claim 6, wherein said first and second springs are respectively plate springs integrally formed with each other.

8. A rotary magnetic disc device as set forth in claim 1, wherein said center core push drive mechanism comprises a center core push member drive lever disposed rotatably in said device main body and adapted, if said cover is closed while said center core push member drive lever is located at a given rotational position, to push against said center core push member so as to incline said center core push member by a given amount of inclination toward said rotary drive shaft.

9. A rotary magnetic disc device as set forth in claim 8, wherein said movable plate is adapted to remove said center core push movement of said center core push member by rotating said center core push member drive lever from said given rotational position to a position where said said center is separated away from center core push member.

10. A rotary magnetic disc device as set forth in claim 1, wherein said center core push drive mechanism comprises a center core push lever disposed rotatably in said device main body and adapted, while said cover is closed, to incline said center core push member correspondingly to the rotational positions thereof, and a center core push member drive lever disposed rotatably in said device main body and having one end which is engageable with said center core push lever to rotate said center core push lever correspondingly to the rotational positions thereof.

11. A rotary magnetic disc device as set forth in claim 10, wherein said movable plate is adapted to perform said center core push operation or said center core push removal operation by rotating said center core push member drive lever.

12. A rotary magnetic disc device as set forth in claim 1, wherein said cam comprises an groove cam formed in an endless shape on one side surface of a gear rotatable by said second rotary dirve source.

13. A rotary magnetic disc device as set forth in claim 12, wherein on the other side surface of said gear there is formed a recess or a projection to operate a switch which is used to detect the rotational reference position of said cam.

* * * * *